(12) United States Patent
Marston et al.

(10) Patent No.: US 8,900,342 B2
(45) Date of Patent: Dec. 2, 2014

(54) PROCESS FOR SEPARATING COPPER AND/OR NICKEL FROM COBALT CONTAINING SOLUTIONS

(75) Inventors: Charles R. Marston, Midland, MI (US); Matthew Rodgers, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 190 days.

(21) Appl. No.: 13/114,863

(22) Filed: May 24, 2011

(65) Prior Publication Data

US 2011/0290077 A1 Dec. 1, 2011

Related U.S. Application Data

(60) Provisional application No. 61/348,136, filed on May 25, 2010.

(51) Int. Cl.
*C22B 3/42* (2006.01)
*C22B 23/00* (2006.01)
*B01D 15/36* (2006.01)
*B01D 15/04* (2006.01)
*C22B 3/00* (2006.01)
*C22B 15/00* (2006.01)

(52) U.S. Cl.
CPC ......... *C22B 23/0453* (2013.01); *C22B 15/0089* (2013.01); *C22B 23/0484* (2013.01); *C22B 3/42* (2013.01)
USPC .............................. 75/743; 75/711; 210/679

(58) Field of Classification Search
USPC ..................... 75/743, 744; 210/656, 660, 679
See application file for complete search history.

(56) References Cited

U.S. PATENT DOCUMENTS

| 4,666,683 A | 5/1987 | Brown |
| 5,571,308 A | 11/1996 | Duyvesteyn |
| 6,350,420 B1 * | 2/2002 | Duyvesteyn et al. ......... 423/139 |
| 7,594,951 B2 | 9/2009 | Rossiter |
| 7,901,484 B2 | 3/2011 | Mendes |
| 2001/0001650 A1 | 5/2001 | Duyvesteyn |
| 2009/0056500 A1 * | 3/2009 | Mendes .......................... 75/743 |
| 2010/0300249 A1 * | 12/2010 | Budac et al. .................... 75/743 |
| 2011/0194999 A1 * | 8/2011 | Nebeker ....................... 423/139 |

OTHER PUBLICATIONS

Dow Chemical, Selectivities of Dowex XUS-43605 as a function of pH, as found in Ion Exchange Resins and Adsorbents in Chemical Processing, 2013, Books on Demand GmbH, p. 42.*
Rosato, et al., "Separation of Nickel From Cobalt in Sulphate Medium by Ion Exchange", Hydrometallurgy, vol. 13, pp. 33-44 (1984).
Grinstead, "Copper-Selective Ion-Exchange Resin with Improved Iron Rejection" J. Metals, vol. 31, No. 3, p. 13 (1979).
L. Rosato, G. B. Harris, R. W. Stanley; Separation of Nickel From Cobalt in Sulphate Medium by Ion Exchange, Paper presented at the 11th AIME Annual Meeting, Dallas Texas Feb. 14-18, 1982.
Robert G. Grinstead, Selective Absorption of Copper, Nickel, Cobalt and Other Transition Metal Ions From Sulfuric Acid Solutions With the Chelating ion Exchange resin XFS 4195; Hydrometallurgy 12 (1984) 387-400; Elsevier Science Publishers B.V. Amsterdam—Printed in the Netherlands.
C. Bailey, G. B. Harris, R. Kuyvenhoven, J. du Plessis; Hatch Africa, Private Bag X230, Gallo Manor, 2052 South AfricaRemoval of Nickel From Cobalt Sulphate Electrolyte Using ISEP Continuous Ion Exchange, Published May 10, 2005.

* cited by examiner

*Primary Examiner* — Kaj K Olsen
*Assistant Examiner* — Jared Wood
(74) *Attorney, Agent, or Firm* — Carl P. Hemenway

(57) ABSTRACT

The present invention relates to a process for the recovery of cobalt comprising: (i) providing a high tenor cobalt solution wherein the high tenor cobalt solution comprises cobalt and nickel; (ii) contacting the high tenor cobalt solution with an N-(2-hydroxypropyl)picolylamine resin to load the N-(2-hydroxypropyl)picolylamine resin with cobalt and nickel; (iii) eluting the cobalt from the loaded N-(2-hydroxypropyl)picolylamine resin; and (iv) eluting the nickel from the loaded N-(2-hydroxypropyl)picolylamine resin.

8 Claims, No Drawings

PROCESS FOR SEPARATING COPPER AND/OR NICKEL FROM COBALT CONTAINING SOLUTIONS

This application claims the benefit of priority under 35 U.S.C. §119(e) of U.S. Provisional Patent Application No. 61/348,136 filed on May 25, 2010.

The present invention relates to an improved process for the separating of copper and/or nickel from solutions containing cobalt.

For many years the unique capability of bis-picolylamine chelating resins, such as DOWEX™ M-4195 and XUS-43578, commercially available from The Dow Chemical Company, to remove traces of nickel from cobalt electrolyte at low pH has given them a special place in the flow-sheets of several cobalt refineries around the world. More recently, cobalt is being recovered as "bonus" metals from copper mining or tailings reprocessing. These cobalt electrolyte streams often contain significant amounts of copper along with small amounts of nickel. While Bis-picolylamine resins perform well for nickel removal, they are hyper-selective for copper and do not elute copper efficiently with sulfuric acid (ammonia or other alkaline is normally required for elution) like they do with nickel, and can therefore, become fouled with copper.

In the production of high grade cobalt from primary cobalt refineries, the purity of the end-stage cobalt electrolyte is paramount to achieving high-grade cobalt specifications upon electro-winning. Several cobalt refineries are taking advantage of selective nickel removal using chelation resins. Most are associated with nickel mining operations and are not challenged by residual copper ions in their high tenor cobalt concentrates. Nevertheless, several new copper producers and a few on-purpose cobalt mines are planning to produce high grade cobalt but are encountering significant levels of copper in their high tenor cobalt concentrates and electrolytes.

Processes for the commercial separation of nickel from high tenor cobalt solutions (i.e. cobalt electrolyte) exist at commercially operated facilities. These processes use nickel selective bis-picolylamine (Bis-PA) functionalized polymeric chelation resin (i.e. DOWEX® M-4195; Dow XUS-43578 chelating resin). Bis-PA resins are unique in the commercial array of ion exchange products. They are capable of adsorbing transition metal ions even at feed pH less than 2, differentiating them from the less versatile iminodiacetic acid (IDA) chelation resins. These resins have proven to be highly economic. New techniques for utilization of Bis-PA resin in continuous ion exchange (CIX) systems have greatly improved separation efficiencies.

The use of CIX technology vs. standard Fixed Bed processing, minimizes resin inventory, water, and chemical usage. Under standard Fixed Bed processing conditions, large portions of the resin inventory are not in a 'working' mode. Only the portion of the resin that is actively undergoing adsorption of the target ion (the mass transfer zone) is doing "work". The balance of the resin is either: 1) exhausted and at equilibrium with the feed; or 2) waiting for solute to arrive. Continuous processing eliminates these inefficiencies by immediately moving exhausted (loaded) resin to the next stage of processing and by minimizing the amount of resin waiting to see feed. CIX provides a highly efficient operation, yielding high quality cobalt electrolyte and marketable nickel byproducts.

A problem arises, however, if the cobalt electrolyte feedstock contains copper ions. The "hyper-selectivity" of the Bis-PA resin for copper ions (Cupreous and Cupric) results in the copper ion fouling the resin, thus diminishing its capacity and effectiveness for nickel removal. Unlike the behavior of nickel and cobalt loaded on Bis-PA resin, the strongly held copper ions are not efficiently eluted from the resin with acidic eluant. Hence, requiring alkaline elution, via a ligand exchange in ammonium hydroxide, which is inconvenient, chemically intensive, and stressful to the resin matrix because of resin shrink and swell during the operation.

Until now, the most practical solution for a cobalt refinery having copper in their cobalt feedstock was to utilize "guard beds" of the same Bis-PA resin, which sacrificially captures the copper, up front of the nickel removal resin. The slightly smaller "guard bed" can then undergo periodic alkaline elution without interrupting the nickel removal process or impacting the larger volume of nickel removal resin. Unfortunately, a "guard bed" system could be costly and cumbersome. Many refinery locations are not capable of, or willing to, take on the expense of handling ammonia and ammoniac waste and by-products.

Fortunately, the present invention solves the problems of the art by providing an alternative process for handling copper in the nickel polishing process. This alternative process, not only is capable of handling the copper, but also lowers operating costs and increases the efficiency of the entire nickel polishing process.

The present invention provides a process for the recovery of cobalt comprising:
i. providing a high tenor cobalt solution wherein the high tenor cobalt solution comprises cobalt and nickel
ii. contacting the high tenor cobalt solution with an N-(2-hydroxypropyl) picolylamine resin to load the N-(2-hydroxypropyl) picolylamine resin with cobalt and nickel;
iii. eluting the cobalt from the loaded N-(2-hydroxypropyl) picolylamine resin; and
iv. eluting the nickel from the loaded N-(2-hydroxypropyl) picolylamine resin.

As used herein by high tenor cobalt solution is meant a solution containing cobalt having at least 10 g/L of cobalt.

In the present invention a high tenor cobalt solution is contacted with an N-(2-hydroxypropyl) picolylamine (HPPA) functionalized resin. The high tenor cobalt solution contains nickel and may also optionally contain copper.

The present invention utilizes an N-(2-hydroxypropyl) picolylamine (HPPA) functionalized resin such as, for example: HPPA Resin; i.e. XUS-43605 or XFS-43084 developmental chelation resins obtained from The Dow Chemical Company. This resin was originally designed as a copper mining resin capable of replacing solvent extractants, they could achieve similar (or better) nickel removal with greater Ni:Co selectivity, while eliminating the need for a copper "guard bed" and alkaline ammonia elution as compared to Bis-PA resin. It is interesting to note that at very low pH the copper affinity for the Bis-PA resin is orders-of-magnitude greater than that of the HPPA resin. At around pH 2, the resin has high affinity for nickel and/or copper but almost no affinity for cobalt, in contrast to the selectivity of the older Bis-PA resin, which at the same pH, binds strongly with all three metals. The pH for the process is effective at low pH. A pH less than or equal to 2 is preferred.

The HPPA resin of the present invention may be used in high performance processes, particularly in continuous ion exchange equipment such as for example those marketed by, Outec, Puritec, Calgon Carbon, and IONEX. Preferably the process of the present invention is continuous.

The HPPA resin of the present invention has a particle diameter of 300-500 microns, preferably from 350-450 microns, and more preferably from 375-475 microns. The HPPA resins of the present invention are macroporous bead resins and are typically uniform particle size.

In the present invention, some amount of cobalt along with the nickel loads on the resin and when copper is present the copper "co-loads" with the nickel on the HPPA resin, yet is eluted readily with an acidic eluant. This differs from methods of the prior art in that an alkaline eluant is not needed. An added benefit of HPPA resin vs. Bis-PA resin of the prior art is that far less cobalt binds to the HPPA resin than to the Bis-PA resin, simplifying the nickel elution and cobalt eluate re-cycle scheme. As nickel and/or copper ions load onto the HPPA resin, cobalt is "bumped" or "squeezed" from the resin and replaced with nickel and copper. During this loading stage, the cobalt elution profile is consistently higher than the feed tenor, indicating that cobalt, after initially binding, is being liberated.

Commercial cobalt refineries using the prior art Bis-PA resin have to deal with the fact that at the point where the resin is exhausted and ready for nickel elution, a significant quantity of cobalt is co-loaded with the nickel. Before nickel can be eluted, the co-loaded cobalt needs to be stripped from the resin and recovered to the process as make-up feed to the cobalt dissolution system. Selective elution of cobalt and nickel is possible by simple acid gradient elution.

The cobalt is eluted from the loaded resin with an acid for example, sulfuric acid such as for example 2% sulfuric acid, so the processing plant generates a relatively undesirable moderately acidic by-product stream about 25% of the original feed volume which contains 5-10 g/L cobalt. Most of this "by-product" can be used as acidic cobalt dissolution make-up, but it nevertheless, represents a 2.5% cobalt recycle hold-up in the overall process vs. less than 0.2% cobalt recycle hold-up for the HPPA resin of the present invention. Selective elution of Co, Ni, and/or Copper is possible by simple acid gradient elution. Therefore, the HPPA resin process dramatically decreases both CAPEX (no need for Cu guard system) and OPEX (lower Co hold-up) for Cobalt Refineries.

EXAMPLE

Example 1

Feed Stock

Example 1 were carried out on mock cobalt electrolyte, prepared by the dissolution of Cobalt (II) sulfate and nickel (II) sulfate in dilute sulfuric acid. The Mock electrolyte contained up to 90 g/L cobalt and 400 ppm Nickel. Mock electrolyte was adjusted to operating pH with sulfuric acid and heated to 70-75 degrees Celsius.

Example 1 was completed using three columns from a CIX pilot skid. Adsorption was done in series and elutions were performed on a single column. The columns were constructed of clear PVC with HASTALLOY wedge-wire screens at top and bottom. These columns were 3.8 cm in diameter and 100 cm tall. Each was charged with 1 L of resin (88 cm deep) and the remainder of the column free-board was filled with inert polypropylene beads.

Adsorption and elution were carried-out in the down-flow mode through Masterflex peristaltic pumps. Adsorption feed flow rates were set at 7.5 Bed Volumes per hour (3 col.×1 L×7.5 L/hr=22.5 L/hr=375 mL/min). Elution flows were set at 5.5 BV to 7 BV per hour or 91.6 to 116 mL/min (only one column per BV).

Grab samples (30 mL) were collected periodically and the time and flow rates recorded. Analysis of Feeds, Products and Raffinates were performed primarily by Atomic Adsorption (AA) Spectroscopy.

What is claimed is:

1. A process for the recovery of cobalt comprising:
   i. providing a high tenor cobalt solution from a cobalt refinery having at least 10 g/L of cobalt, wherein the high tenor cobalt solution additionally comprises nickel,
   ii. contacting the high tenor cobalt solution with an N-(2-hydroxypropyl)picolylamine resin to load the N-(2-hydroxypropyl)picolylamine resin with cobalt and nickel;
   iii. selectively eluting the cobalt with an eluent from the loaded N-(2-hydroxypropyl)picolylamine resin; and
   iv. after said step iii, selectively eluting the nickel from the loaded N-(2-hydroxypropyl)picolylamine resin.

2. The process of claim 1 wherein the pH of said eluent is less than or equal to 2 during said step iii.

3. The process of claim 1 wherein the high tenor cobalt solution further comprises copper.

4. The process of claim 3 wherein the cobalt, copper, and nickel are eluted by acid gradient elution.

5. The process of claim 3 wherein the process is continuous.

6. The process of claim 1 wherein the process is continuous.

7. The process of claim 1 wherein the cobalt and nickel are eluted by acid gradient elution.

8. The process of claim 1, wherein the cobalt is eluted with sulfuric acid.

* * * * *